(12) United States Patent  (10) Patent No.: US 6,945,108 B2
Kim et al.  (45) Date of Patent:  Sep. 20, 2005

(54) FUEL LEVEL SYSTEM FOR AUTOMOBILE

(75) Inventors: Hyun Bok Kim, Incheon (KR); In Seok Sohn, Cheongju-si (KR); Young Chol Chol, Cheonan-si (KR); Han Mu Kim, Daejeon (KR)

(73) Assignee: Korea Automotive Fuel Systems Ltd., Chungcheongnam-do (KR)

( * ) Notice: Subject to any disclaimer, the term of this patent is extended or adjusted under 35 U.S.C. 154(b) by 0 days.

(21) Appl. No.: 10/724,210

(22) Filed: Dec. 1, 2003

(65) Prior Publication Data

US 2004/0163465 A1 Aug. 26, 2004

(30) Foreign Application Priority Data

Dec. 5, 2002 (KR) ................... 10-2002-0076850
Sep. 1, 2003 (KR) ................... 10-2003-0060920

(51) Int. Cl.[7] ............................................. G01F 23/00
(52) U.S. Cl. .................... 73/304 R; 73/305; 73/309; 73/313; 73/290 R
(58) Field of Search ..................... 73/304 R, 305, 73/309, 313, 290 R

(56) References Cited

U.S. PATENT DOCUMENTS

| | | | | |
|---|---|---|---|---|
| 4,550,261 A | * | 10/1985 | Hormel et al. | 307/118 |
| 4,884,207 A | * | 11/1989 | Asada et al. | 701/101 |
| 5,172,007 A | * | 12/1992 | Lumetta et al. | 307/10.1 |
| 5,623,907 A | * | 4/1997 | Cotton et al. | 123/456 |
| 5,746,088 A | * | 5/1998 | Sawert et al. | 73/317 |
| 6,021,668 A | * | 2/2000 | Sawert et al. | 73/313 |
| 2003/0195692 A1 | * | 10/2003 | Stevens | 701/104 |
| 2004/0163465 A1 | * | 8/2004 | Kim et al. | 73/304 R |

* cited by examiner

Primary Examiner—Hezron Williams
Assistant Examiner—Rodney T. Frank
(74) Attorney, Agent, or Firm—Greenblum & Bernstein, P.L.C.

(57) ABSTRACT

The present invention relates to a fuel level system for an automobile, and more particularly, to a fuel level system for use in informing a driver of the amount of remaining fuel in a fuel tank of an automobile using gasoline, light oil, gas or the like, wherein a flowing electric current is increased in a contact of a level sender unit. The fuel level system of the present invention comprises a level sender unit installed in a fuel tank of the automobile, a fuel gauge, and a resistor installed inside or outside the level sender unit within the fuel level system to increase an electric current flowing through a contact of the level sender unit.

12 Claims, 8 Drawing Sheets

FUEL LEVEL SYSTEM FOR AUTOMOBILE

RELATED APPLICATIONS

The present disclosure relates to subject matter contained in Korean Application No. 10-2002-0076850 filed on Dec. 5, 2002 and No. 10-2003-0060920 filed on Sep. 1, 2003, which are herein expressly incorporated by reference its entireties.

BACKGROUND OF THE INVENTION

1. Field of Invention

The present invention relates to a fuel level system for an automobile, and more particularly, to a fuel level system for use in informing a driver of the amount of remaining fuel in a fuel tank of an automobile using gasoline, light oil, gas or the like, wherein an electric current flowing through a contact of a level sender unit is increased so as to eliminate contact resistance resulting from silver sulfide, silver oxide or other foreign materials generated due to corrosion in the contact of the level sender unit, thereby preventing wrong indication of a fuel gauge due to the contact resistance in the contact and more accurately providing the driver with information on the amount of remaining fuel.

2. Description of the Prior Art

Generally, an automobile is equipped with a fuel level system for informing a driver of the amount of remaining fuel in a fuel tank of the automobile. The fuel level system detects the amount of remaining fuel and then operates a fuel gauge disposed on an instrument panel on the side of a driver's seat.

FIG. 1 is a sectional view schematically showing of a conventional fuel level system for an automobile, and FIG. 2 is a circuit diagram showing one example of the conventional the fuel level system. As shown in the figures, the conventional fuel level system comprises a level sender unit 20 that is installed in a fuel tank 10 and provided with a level resistor 21; a pivotable bar 22 with a movable piece connected to the level resistor 21 of the level sender unit 20 via a contact to change the resistance of the level resistor 21; and a float 23 capable of operating the bar 22 in an interlocked manner.

An ECU 30 receives a voltage drop signal corresponding to the amount of remaining fuel in the fuel tank 10 from the level sender unit 20 and utilizes the signal as an operation factor for checking whether evaporated gas leaks out. The ECU 30 performs the function of converting information on the check results into a pulse width control signal and sends the pulse width control signal to a fuel gauge 40.

Then, the fuel gauge 40 receives the pulse width control signal from the ECU 30 or the voltage drop signal directly from the level sender unit 20, and indicates the amount of remaining fuel in the fuel tank 10 in a graphical manner or using a pointer.

The operational relationship among the above components will be described hereinafter with reference to FIG. 2.

First, the ECU 30 comprises a pull-up resistor 31, and the pull-up resistor 31 and the level resistor 21 of the level sender unit 20 are connected in series via the contact of the movable piece connected to the bar 22. When a 5V constant-voltage power source 32 within the ECU 30 is applied to and energizes the serial circuit, the value of voltage drop (VL) corresponding to the amount of remaining fuel in the fuel tank 10 occurs in the level resistor 21.

Then, an AD converter 33 in the ECU 30 measures the value of the voltage drop through a monitoring resistor 34 and sends a pulse width control signal corresponding to the value of the voltage drop to the fuel gauge 40 so that the amount of remaining fuel can be indicated to a driver.

Meanwhile, as shown in FIG. 3, it is possible to employ a pull-down resistor 35 connected directly to the level resistor 21 instead of the pull-up resistor 31 and to connect the AD converter 33 to the pull-down resistor 35. However, even in this case, the operational relationship is the same.

FIGS. 4 and 5 are circuit diagrams showing other examples of the conventional fuel level system for an automobile. In these examples, the conventional fuel level system only comprises the level sender unit 20 and a microcomputer-type fuel gauge 40 without such an ECU 30. There is a difference in that the microcomputer-type fuel gauge 40 in FIG. 4 contains a microcomputer 41 and a pull-up resistor 42 in FIG. 4, whereas the microcomputer-type fuel gauge 40 in FIG. 5 contains the microcomputer 41 and a pull-down resistor 43.

Additionally, there has been used a fuel level system employing a cross coil-type or bimetal-type gauge as shown in FIG. 6. In this case, the voltage of 12V of a battery in the automobile may be applied to the gauge 50, or a 5~12V constant-voltage power source 51 may be independently connected to the gauge 50. Alternatively, the ECU 30 may be connected in parallel to use information on determination of the amount of remaining fuel upon control of leak of evaporated gas.

Although various types of fuel level systems have been used as described above, all the fuel level systems utilize in common the contact of the movable piece and the level resistor 21 of the level sender unit 20.

Metals such as AgCu, AgPd or AgNi containing silver (Ag) are mainly used for a conductive portion of the level resistor 21 and the contact of the movable piece. At this time, the silver (Ag) and sulfur (S) contained in fuel react with each other and thus produce silver sulfide as well as silver oxide due to oxidation in the air. Such silver sulfide and silver oxide generate contact resistance in the contact. Thus, there may be a problem in that the fuel gauge of the fuel level system may not indicate a correct value.

As for methods of minimizing such contact resistance, there are the following methods.

First, it is possible to conceive a method by which the contact of the movable piece and the conductive portion of the level resistor are made of a material that cannot be oxidized or corroded. However, there is no feasibility because of a limitation on material technology and high costs.

Second, it is possible to conceive a method by which an oxidized portion can be worn out by increasing contact pressure in the contact of the movable piece during its operation. However, there is a limitation on the durability of the contact.

Finally, it is possible to conceive a method by which an electric current flowing through the contact is increased so that produced contact resistance can be eliminated due to the increased electric current.

To this end, the value of pull-up or down resistance in an electronic control module and the fuel gauge is caused to be decreased and the value of level resistance of the level sender unit is also caused to be decreased. However, in order to cause the fuel gauge to more accurately indicate the amount of remaining fuel, a sufficient gap should be given between the maximum and minimum values of the level resistance. Thus, there is a limitation on the decrease in the value of the resistance.

SUMMARY OF THE INVENTION

The present invention is contemplated to solve the aforementioned drawbacks or problems in the prior art. An object of the present invention is to provide a fuel level system for an automobile, wherein contact resistance resulting from silver sulfide, silver oxide or other foreign materials generated due to corrosion in a contact of a level sender unit is eliminated, thereby preventing wrong indication of a fuel gauge due to the contact resistance in the contact and more accurately providing a driver with information on the amount of remaining fuel.

According to an aspect of the present invention for achieving the object, there is provided a fuel level system for an automobile including a level sender unit installed in a fuel tank of the automobile and a fuel gauge, comprising a resistor installed inside or outside the level sender unit within the fuel level system to increase an electric current flowing through a contact of the level sender unit.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, preferred embodiments of a fuel level system for an automobile according to the present invention will be described in detail with reference to the accompanying drawings.

Figure 1:
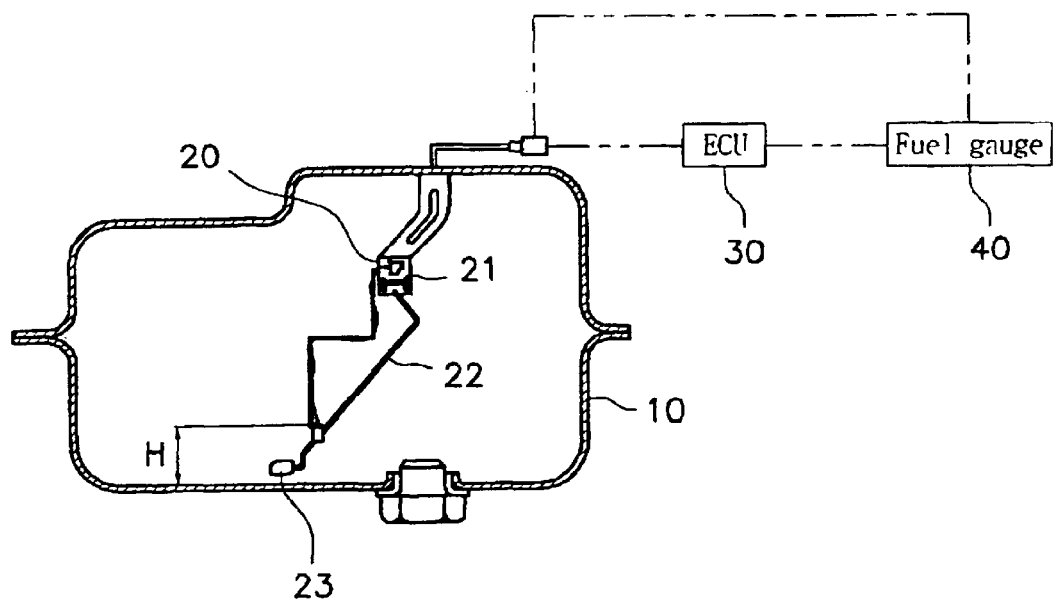
FIG. 1 is a sectional view schematically showing a conventional fuel level system for an automobile.
Figure 2:
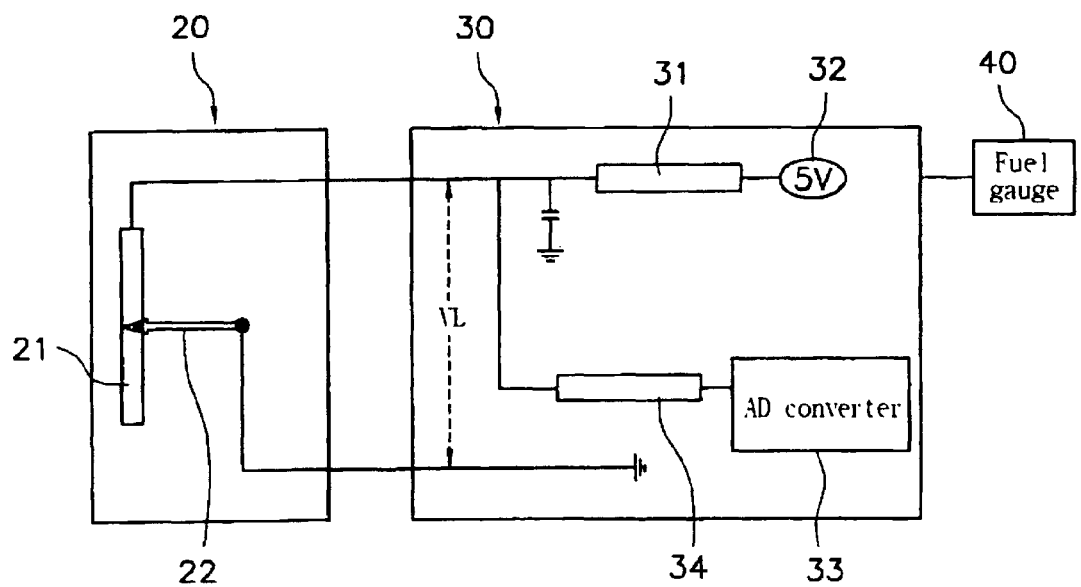
FIG. 2 is a circuit diagram showing a first example of the conventional fuel level system.
Figure 3:
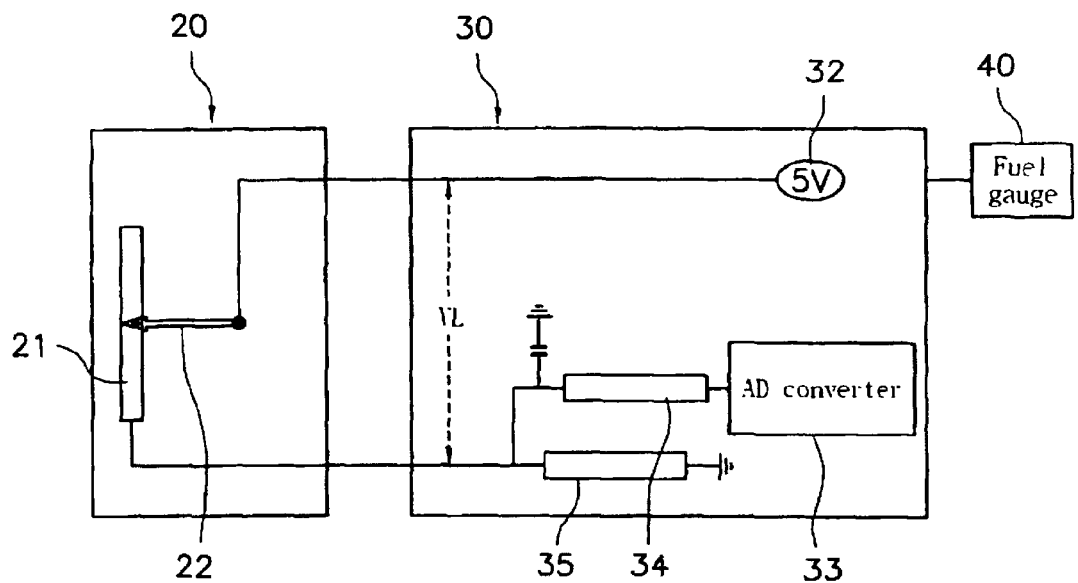
FIG. 3 is a circuit diagram showing a second example of the conventional fuel level system.
Figure 4:
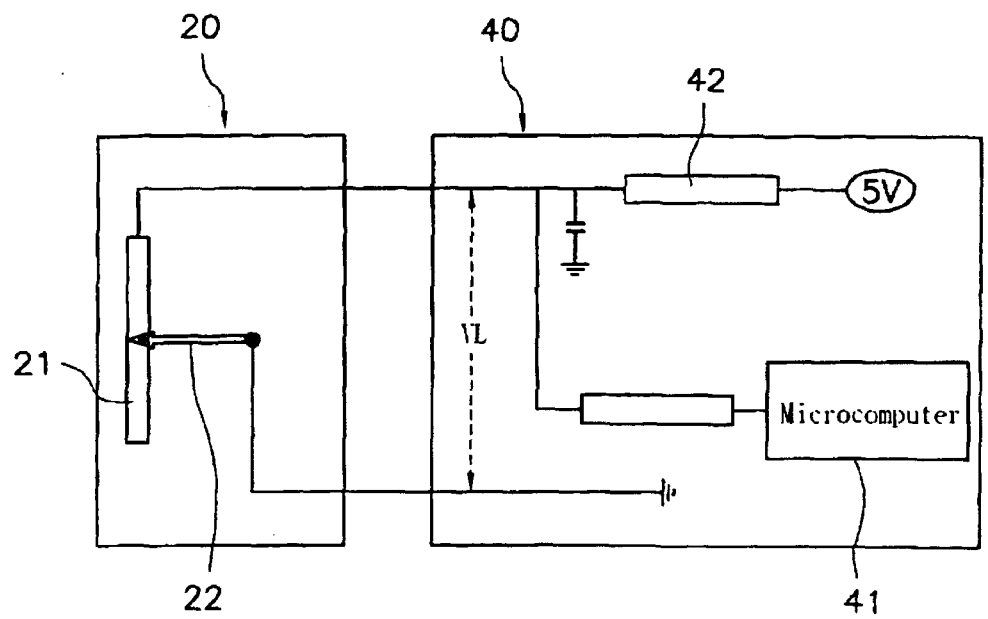
FIG. 4 is a circuit diagram showing a third example of the conventional fuel level system.
Figure 5:
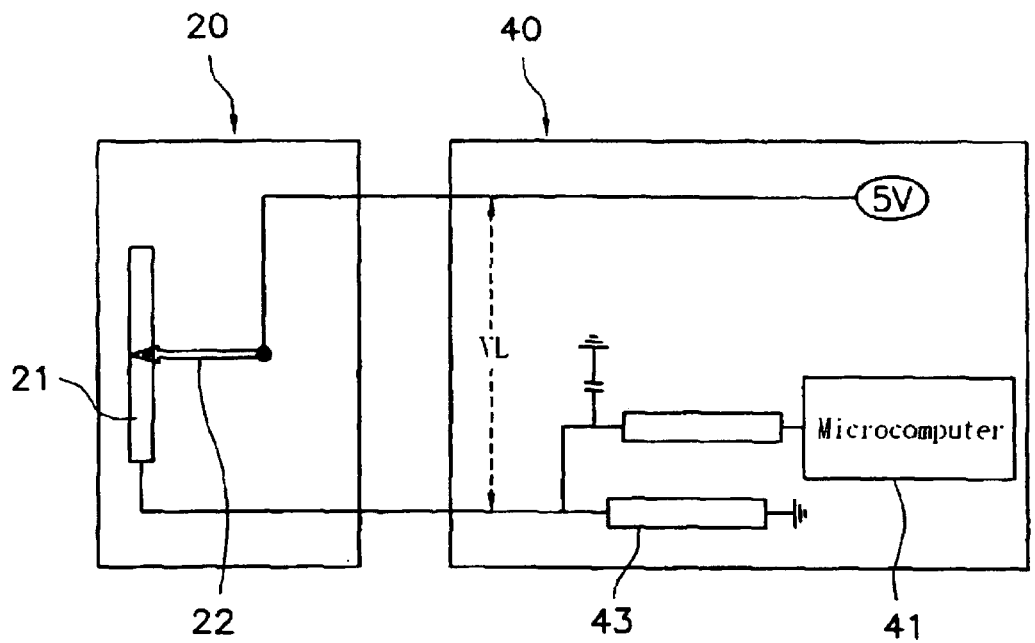
FIG. 5 is a circuit diagram showing a fourth example of the conventional fuel level system.
Figure 6:
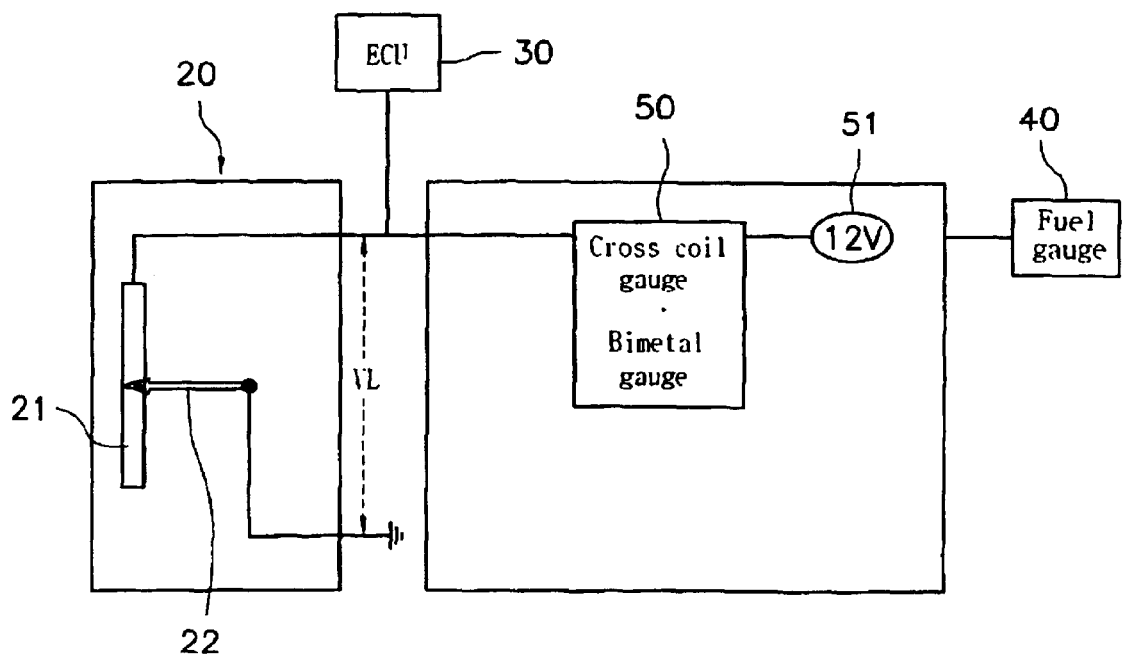
FIG. 6 is a circuit diagram showing a sixth example of the conventional fuel level system.
Figure 7:
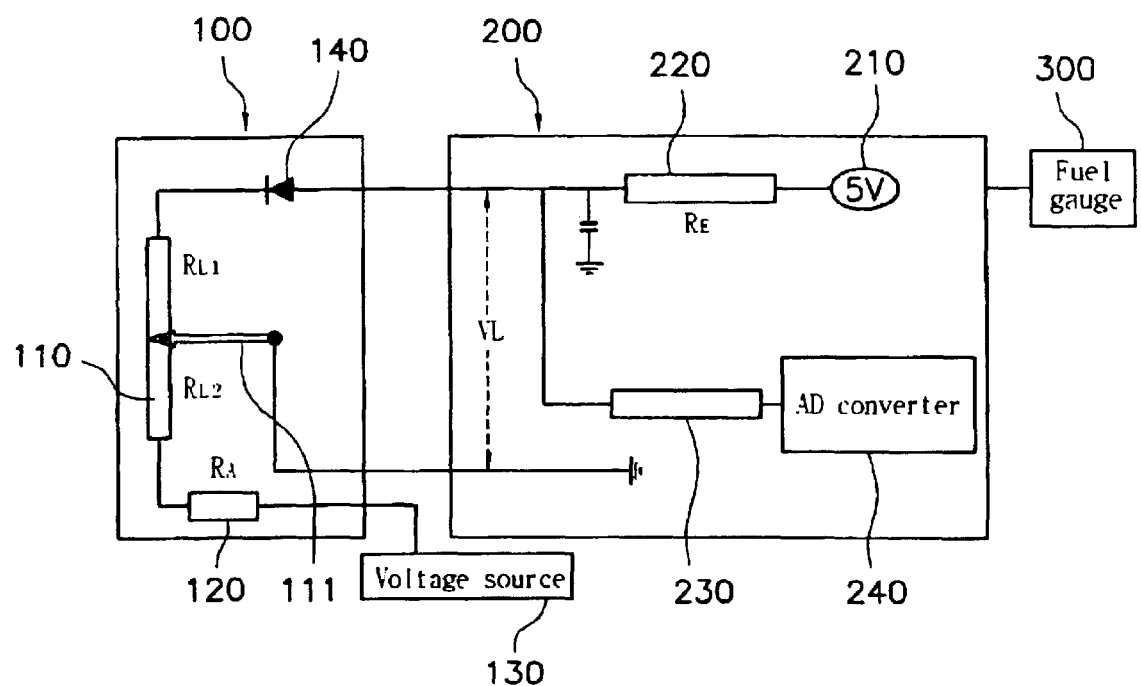
FIG. 7 is a circuit diagram showing a first embodiment of a fuel level system for an automobile according to the present invention.

FIG. 7 is a circuit diagram showing a first embodiment of the fuel level system for the automobile according to the present invention. The fuel level system of the present invention comprises a level sender unit 100 installed in a fuel tank of the automobile, a fuel gauge 300, and a resistor 120 installed inside or outside the level sender unit 100 within the fuel level system to increase an electric current flowing through a contact of the level sender unit 100.

In the first embodiment shown in FIG. 7, the fuel level system comprises the level sender unit 100 that is installed within the fuel tank and includes a level resistor 110 of which a resistance value varies by means of a movable piece 111 operated in a state where it is interlocked with a float, and the resistor 120 connected in series to a side of the level resistor 110 and an ignition power source or constant-voltage power source (energizing voltage source) 130 connected in series to the resistor 120; and an ECU 200 that includes a pull-up resistor 220 connected in series to the level resistor 110 of the level sender unit 100 and to a power source 210, and a monitoring resistor 230 and an AD converter 240 connected to the pull-up resistor 220, thereby measuring the value of voltage drop due to the level resistor 110 and the pull-up resistor 220 and sending the measured value to the fuel gauge 300 through the AD converter 240.

The constant-voltage power source generally outputs a constant voltage in a range of 5 to 12V.

Contact failure may sometimes occur between the level resistor 110 and the contact of the movable piece 111 that comes into contact with the level resistor 110. In such a case, an inverse electric current may be produced toward the ECU 200 by the energizing voltage source 130. Therefore, in order to prevent the inverse electric current, a diode 140 may be disposed between the level resistor 110 and the pull-up resistor 220, if necessary.

Figure 8:
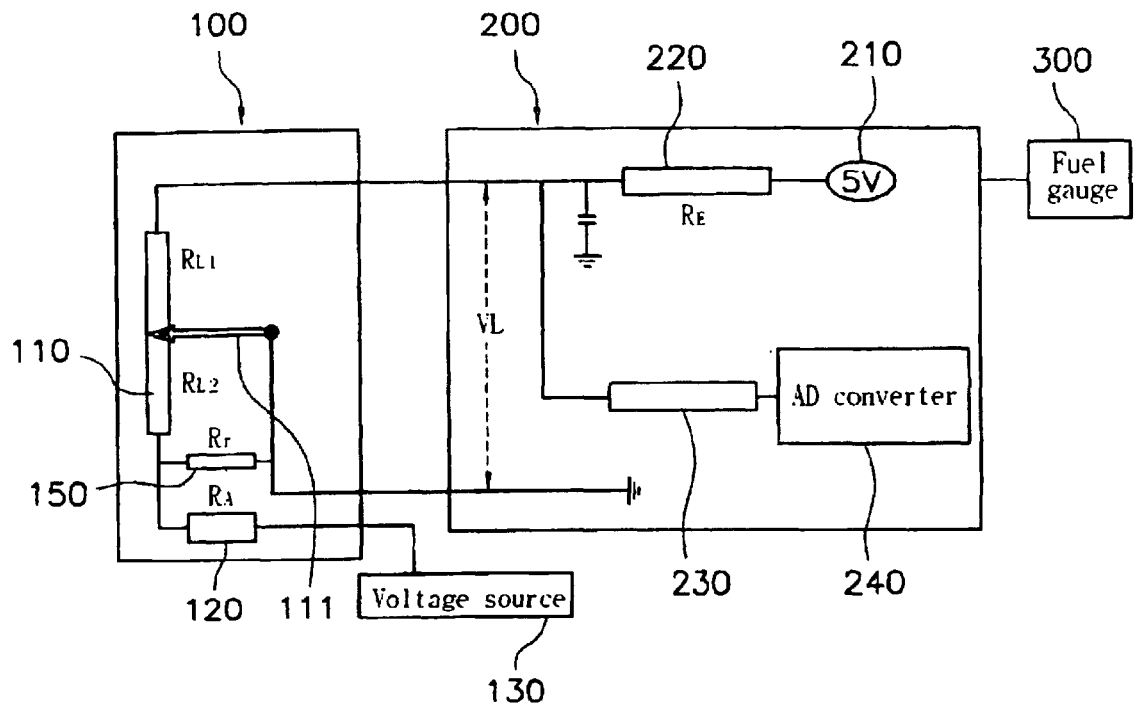
FIG. 8 is a circuit diagram showing a configuration for preventing an inverse electric current in the fuel level system of FIG. 7.

Further, the inverse electric current may be prevented by disposing a resistor $R_r$ 150 between a connection of a lower end of the level resistor 110 and the resistor 120 and a ground connected to the movable piece 111, as shown in FIG. 8.

Figure 9:
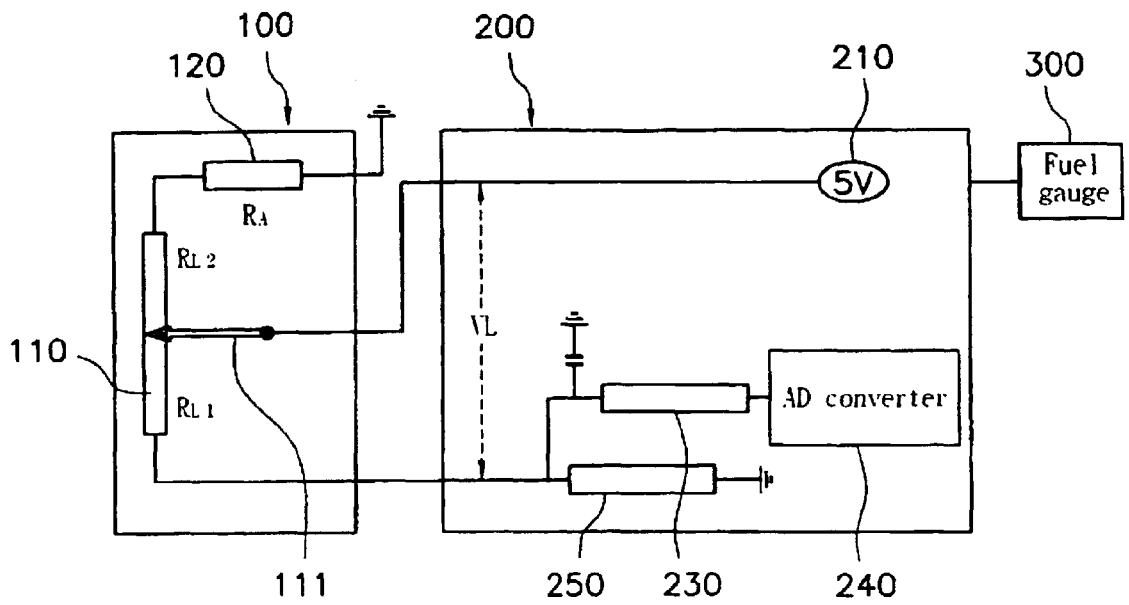
FIG. 9 is a circuit diagram showing a second embodiment of the fuel level system for the automobile according to the present invention.

FIG. 9 is a circuit diagram showing a second embodiment of the fuel level system for the automobile according to the present invention. In this embodiment, a pull-down resistor is employed in the fuel level system.

In the second embodiment, the fuel level system comprises the level sender unit 100 that is installed within the fuel tank and includes the level resistor 110 of which the resistance value varies by means of the movable piece 111 operated in a state where it is interlocked with the float, and the resistor 120 of which one side is connected in series to the level resistor 110 and the other side is grounded; and the ECU 200 that includes a pull-down resistor 250 of which one side is grounded and the other side is connected in series to the level resistor 110 of the level sender unit 100, the power source 210 connected in series to the movable piece 111, and the monitoring resistor 230 and the AD converter 240 connected to the pull-down resistor 250, thereby measuring the value of voltage drop due to the level resistor 110 and the pull-down resistor 250 and sending the measured value to the fuel gauge 300 through the AD converter 240.

Figure 10:
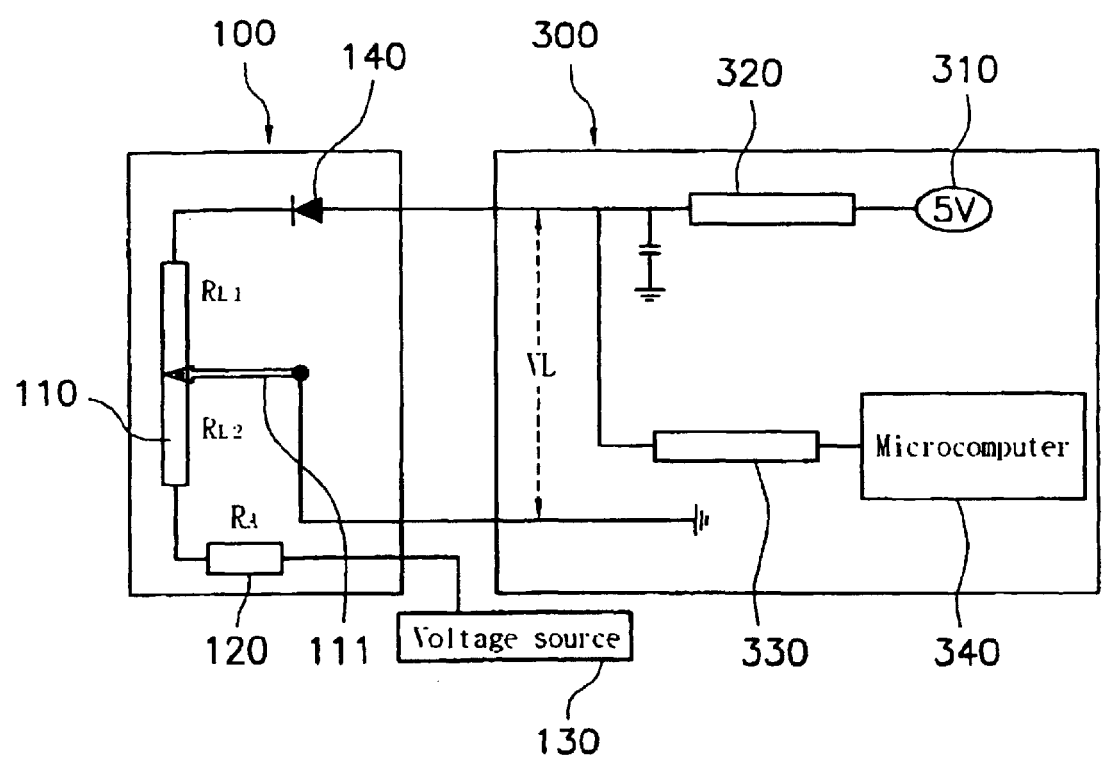
FIG. 10 is a circuit diagram showing a third embodiment of the fuel level system for the automobile according to the present invention.
Figure 11:
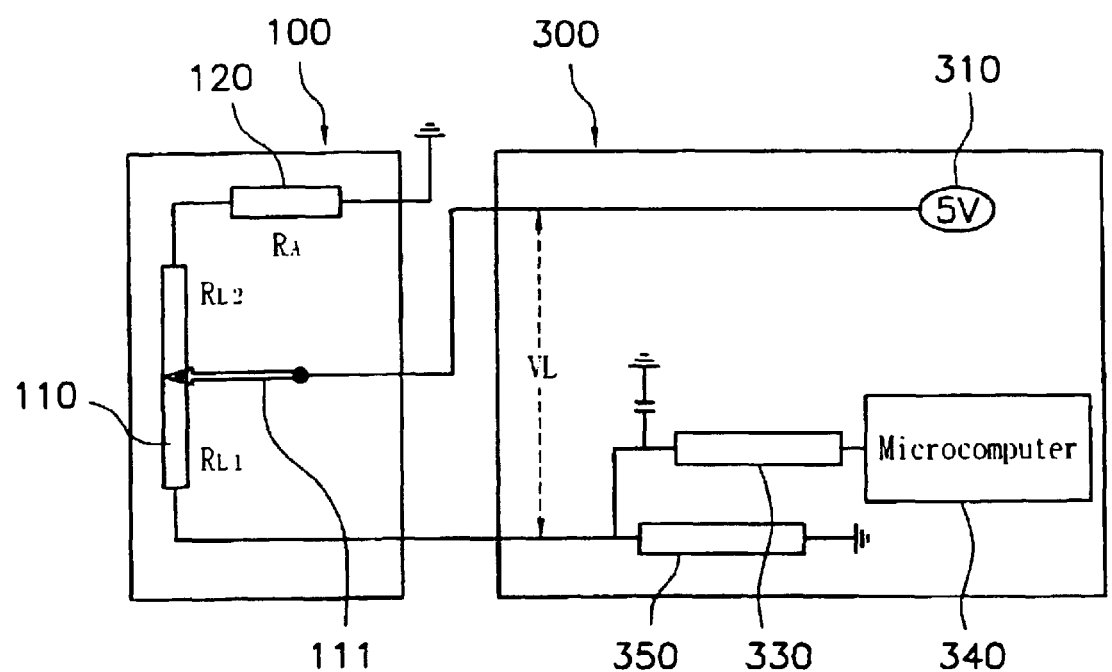
FIG. 11 is a circuit diagram showing a fourth embodiment of the fuel level system for the automobile according to the present invention.

Meanwhile, in third and fourth embodiments of the present invention shown in FIGS. 10 and 11, the technical spirit of the present invention is applied to a fuel gauge using a microcomputer.

That is, although the level sender unit 100 in the third embodiment is the same as the first embodiment, the fuel level system of this embodiment is different from that of the first embodiment in that it comprises, instead of the ECU, the fuel gauge 300 which includes a pull-up resistor 320 connected in series to the level resistor 110 of the level sender unit 100 and to a power source 310 thereof, and a monitoring resistor 330 and a microcomputer 340 connected to the pull-up resistor 320, whereby the microcomputer 340 measures the value of voltage drop due to the level resistor 110 and the pull-up resistor 320 and informs a user of the value.

Even in the third embodiment, in order to prevent an inverse electric current resulting from contact failure which may sometimes occur between the level resistor 110 and the contact of the movable piece 111 that comes into contact with the level resistor 110, the diode 140 may be disposed between the level resistor 110 and the pull-up resistor 220, or the resistor $R_r$ 150 may be disposed between the connection of the lower end of the level resistor 110 and the resistor 120 and the ground connected to the movable piece 111, in the same manner as the first embodiment (FIG. 10 shows a state where the diode 140 is disposed).

Moreover, although the level sender unit 100 in the fourth embodiment is the same as the second embodiment, the fuel level system of this embodiment comprises, in addition to this level sender unit 110, the fuel gauge 300 which includes a pull-down resistor 350 of which one side is grounded and the other side is connected in series to the level resistor 110 of the level sender unit 100, the power source 310 connected in series to the movable piece 111, and the monitoring resistor 330 and the microcomputer 340 connected to the pull-down resistor 350, whereby measuring the value of voltage drop due to the level resistor 110 and the pull-down resistor 350 and informing the user of the value.

Figure 12:
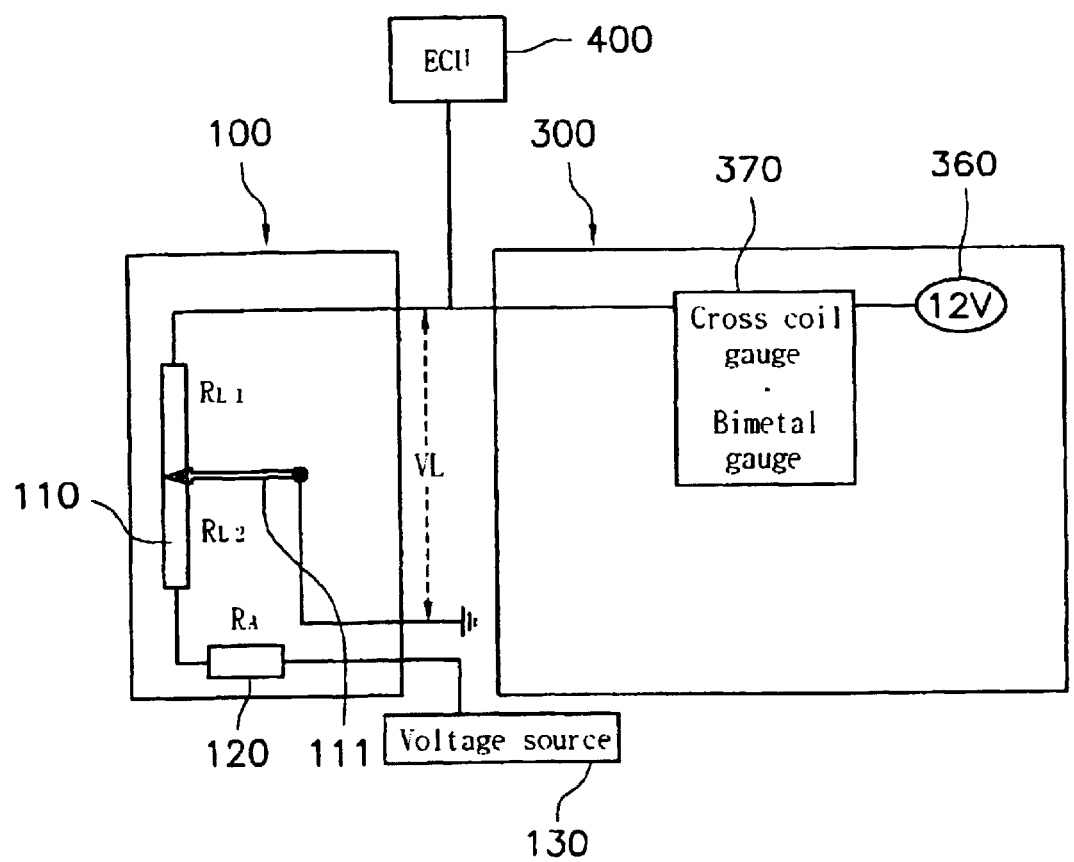
FIG. 12 is a circuit diagram showing a fifth embodiment of the fuel level system for the automobile according to the present invention.

FIG. 12 is a circuit diagram showing a fifth embodiment of the fuel level system for the automobile according to the present invention. The level sender unit 100 in this embodiment measures the value of voltage drop due to the level resistor 110 in the same manner as in the first and third embodiments, but is connected to a cross coil or bimetal gauge 370 provided with a 12V power source 360. The ECU 200 may be connected in parallel to the level sender unit 100 to control evaporated gas, if necessary.

In the first to third and fifth embodiments, a 5V constant-voltage power source is used as the power source, and a 12V ignition power source or a 5~12V constant-voltage power source is used as the power source (energizing voltage source) applied to the resistor 120.

Hereinafter, the operation and effects of the present invention will be described with reference to FIGS. 7 to 12.

The description will be made by focusing on the operation of the first embodiment shown in FIG. 7. The power source 210 of the ECU 200 is first applied to the circuit in which the pull-up resistor 220 is connected in series to the level resistor 110 of the level sender unit 100. Then, voltage drop corresponding to the amount of remaining fuel occurs in the level resistor 110. This is the same as the prior art.

An electric current $I_{L1}$ flowing through the contact of the movable piece 111 through the circuit is calculated from $5/(R_E+R_{L1})$, where $R_E$ is a resistance value of the pull-up resistor 220 of the ECU 200, and $R_{L1}$ is a resistance value of the level resistor 110 corresponding to the amount of remaining fuel in the fuel tank.

At this time, a flowing electric current $I_A$ increased by means of the resistor 120 in the present invention is calculated from (energizing voltage)/$(R_A+R_{L2})$, where $R_A$ is a resistance value of the resistor 120 and $R_{L2}$ is a value obtained by subtracting $R_{L1}$ from the total resistance value of the level resistor 110.

As described above, according to the present invention, it will be understood that the contact electric current flowing through the contact of the movable piece 111 and a contact portion of the level resistor 110 is increased by $I_A$ and thus the total electric current of $I_A+I_L$ flows. The increased amplitude of the flowing electric current can be very widely adjusted depending on the setting of the value of $R_A$. Therefore, it is possible to ensure a flowing electric current with a sufficient amplitude capable of preventing the generation of contact resistance in the contact.

That is, in the circuit of the conventional fuel level system, a flowing electric current at one of an empty position (where the amount of remaining fuel is minimum) and a full position (where the amount of remaining fuel is maximum) is inevitably lower relatively than that at the other position. However, according to the present invention, a flowing lower electric current at the position in which the flowing electric current was relatively lower in the conventional fuel level system can become larger than the relatively larger electric current in the conventional fuel level system.

Further, as described above, contact failure may sometimes occur between the level resistor 110 and the contact of the movable piece 111 that comes into contact with the level resistor 110. In such a case, an inverse electric current may be produced toward the ECU 200 by the energizing voltage source 130. Therefore, the diode 140 is disposed between the level resistor 110 and the pull-up resistor 220, so that the inverse electric current which may flow from the energizing voltage source 130 to the ECU 200 through the resistor 120 and the level resistor 110 can be prevented.

Meanwhile, in the case where the resistor $R_r$ 150 is disposed between the connection of the lower end of the level resistor 110 and the resistor 120 and the ground connected to the movable piece 111, distributed voltages are applied to the resistor 120 and the resistor 150. Therefore, even though contact failure occurs, a higher voltage is applied to the ECU 200. Accordingly, the inverse electric current is prevented.

Generally, when the resistance value of the resistor $R_r$ is lower than that of the resistor 120, the resistor $R_r$ can perform such a function.

The second embodiment is an embodiment in which the pull-down resistor is contained in the ECU and the resistor 120 is provided. In this embodiment, the amplitude of the flowing electric current $I_A$ is calculated from (energizing voltage)/$(R_A+R_{L2})$.

The third embodiment is an embodiment in which the resistor 120 is added to the fuel level system including the fuel gauge that contains the pull-up resistor and the microcomputer. In this case, it can be understood that the amplitude of the flowing electric current $I_A$ is $12/(R_A+R_{L2})$, which is the same as the first embodiment.

Furthermore, the fourth embodiment shown in FIG. 11 is an embodiment in which the resistor 120 is added to the fuel level system including the fuel gauge that contains the pull-down resistor and the microcomputer. In this case, the amplitude of the flowing electric current $I_A$ is (energizing voltage)/$(R_A+R_{L2})$ which is the same as the second embodiment.

Finally, the fifth embodiment shown in FIG. 12 is an embodiment in which the cross coil gauge is employed. The bimetal type gauge may be employed instead of the cross coil gauge. In this case, the amplitude of the flowing electric current is calculated from (energizing voltage)/$(R_A+R_{L2})$.

According to the fuel level system for the automobile, contact resistance resulting from silver sulfide, silver oxide or other foreign materials generated due to corrosion in the contact of the level sender unit is eliminated, thereby preventing wrong indication of the fuel gauge due to the contact resistance in the contact and more accurately providing a driver with information on the amount of remaining fuel.

The embodiments of the present invention described above are merely examples for specifically explaining the technical spirit of the invention. Therefore, the scope of the invention is not limited to the embodiments illustrated in the accompanying drawings.

What is claimed is:

1. A fuel level system for an automobile including a level sender unit installed in a fuel tank of the automobile and a fuel gauge, comprising:
   a resistor installed inside or outside the level sender unit within the fuel level system to increase an electric current flowing through a contact of the level sender unit.

2. A fuel level system for an automobile, comprising:
   a level sender unit which is installed within a fuel tank, and includes a level resistor of which a resistance value varies by a movable piece operated in a state where it is interlocked with a float, and an additional resistor connected in series to a side of the level resistor and an ignition power source or constant-voltage power source connected in series to the additional resistor; and
   an ECU which includes a pull-up resistor connected in series to the level resistor of the level sender unit and to a power source thereof, and a monitoring resistor and an AD converter connected to the pull-up resistor, thereby measuring the value of voltage drop due to the level resistor and the pull-up resistor and sending the measured value to a fuel gauge through the AD converter.

3. The system as claimed in claim 2, wherein a diode for preventing an inverse electric current is further disposed between the level resistor and the pull-up resistor.

4. The system as claimed in claim 2, wherein a further resistor is disposed between a connection of a lower end of the level resistor and the additional resistor and a ground connected to the movable piece, thereby preventing an inverse electric current.

5. A fuel level system for an automobile, comprising:
   a level sender unit which is installed within a fuel tank, and includes a level resistor of which a resistance value varies by a movable piece operated in a state where it is interlocked with a float, and an additional resistor of which one side is connected in series to the level resistor and the other side is grounded; and
   an ECU which includes a pull-down resistor of which one side is grounded and the other side is connected in series to the level resistor of the level sender unit, a power source connected in series to the movable piece, and a monitoring resistor and an AD converter connected to the pull-down resistor, thereby measuring the value of voltage drop due to the level resistor and the pull-down resistor and sending the measured value to a fuel gauge through the AD converter.

6. A fuel level system for an automobile, comprising:
   a level sender unit which is installed within a fuel tank, and includes a level resistor of which a resistance value varies by a movable piece operated in a state where it is interlocked with a float, and an additional resistor connected in series to a side of the level resistor and an ignition power source or constant-voltage power source connected in series to the additional resistor; and
   a fuel gauge which includes a pull-up resistor connected in series to the level resistor of the level sender unit and to a power source thereof, and a monitoring resistor and a microcomputer connected to the pull-up resistor, wherein the microcomputer measures the value of voltage drop due to the level resistor and the pull-up resistor and informs a user of the value.

7. The system as claimed in claim 6, wherein a diode for preventing an inverse electric current is further disposed between the level resistor and the pull-up resistor.

8. The system as claimed in claim 6, wherein a further resistor is disposed between a connection of a lower end of the level resistor and the additional resistor and a ground connected to the movable piece, thereby preventing an inverse electric current.

9. A fuel level system for an automobile, comprising:
   a level sender unit which is installed within a fuel tank, and includes a level resistor of which a resistance value varies by a movable piece operated in a state where it is interlocked with a float, and an additional resistor of which one side is connected in series to the level resistor and the other side is grounded; and
   a fuel gauge which includes a pull-down resistor connected in series to the level resistor of the level sender unit and to a power source thereof, and a monitoring resistor and a microcomputer connected to the pull-down resistor, wherein the microcomputer measures the value of voltage drop due to the level resistor and the pull-down resistor and informs a user of the value.

10. A fuel level system for an automobile, comprising:
    a level sender unit which is installed within a fuel tank, and includes a level resistor of which a resistance value varies by a movable piece operated in a state where it is interlocked with a float, and an additional resistor connected in series to a side of the level resistor and an ignition power source or constant-voltage power source connected in series to the additional resistor; and
    a cross coil or bimetal gauge provided with a power source and connected in series to the level resistor of the level sender unit and the power source.

11. A fuel level monitoring system, comprising:
    a level sender unit in a fuel tank, the level sender including a level resistor having a variable resistance and connected to a movable member attached to a float, and a first resistor electrically connected in series between the level resistor and a first power source;
    an electronic control unit (ECU) including a pull-up resistor electrically connected in series between the level resistor and a second power source, a monitoring resistor, and an analog-to-digital (AD) converter electrically connected to the pull-up resistor, the ECU configured to measure a voltage difference caused by the level resistor and the pull-up resistor and to communicate the measured voltage difference to a fuel gauge via the AD converter; and
    a second resistor connected between a common node of the level resistor and the first resistor and a ground potential electrically connected to the movable member,
    wherein the second resistor has a lower resistance than the first resistor.

12. A fuel level monitoring system, comprising:
    a level sender unit in a fuel tank, the level sender including a level resistor having a variable resistance and connected to a movable member attached to a float, and a first resistor electrically connected in series between the level resistor and a first power source;
    one of a cross coil or a bimetal gauge electrically connected to a second power source and connected in series to the level resistor and the second power source; and a second resistor connected between a common node of the level resistor and the first resistor and a ground potential electrically connected to the movable member, wherein the second resistor has a lower resistance than the first resistor.

* * * * *